Patented July 8, 1924.

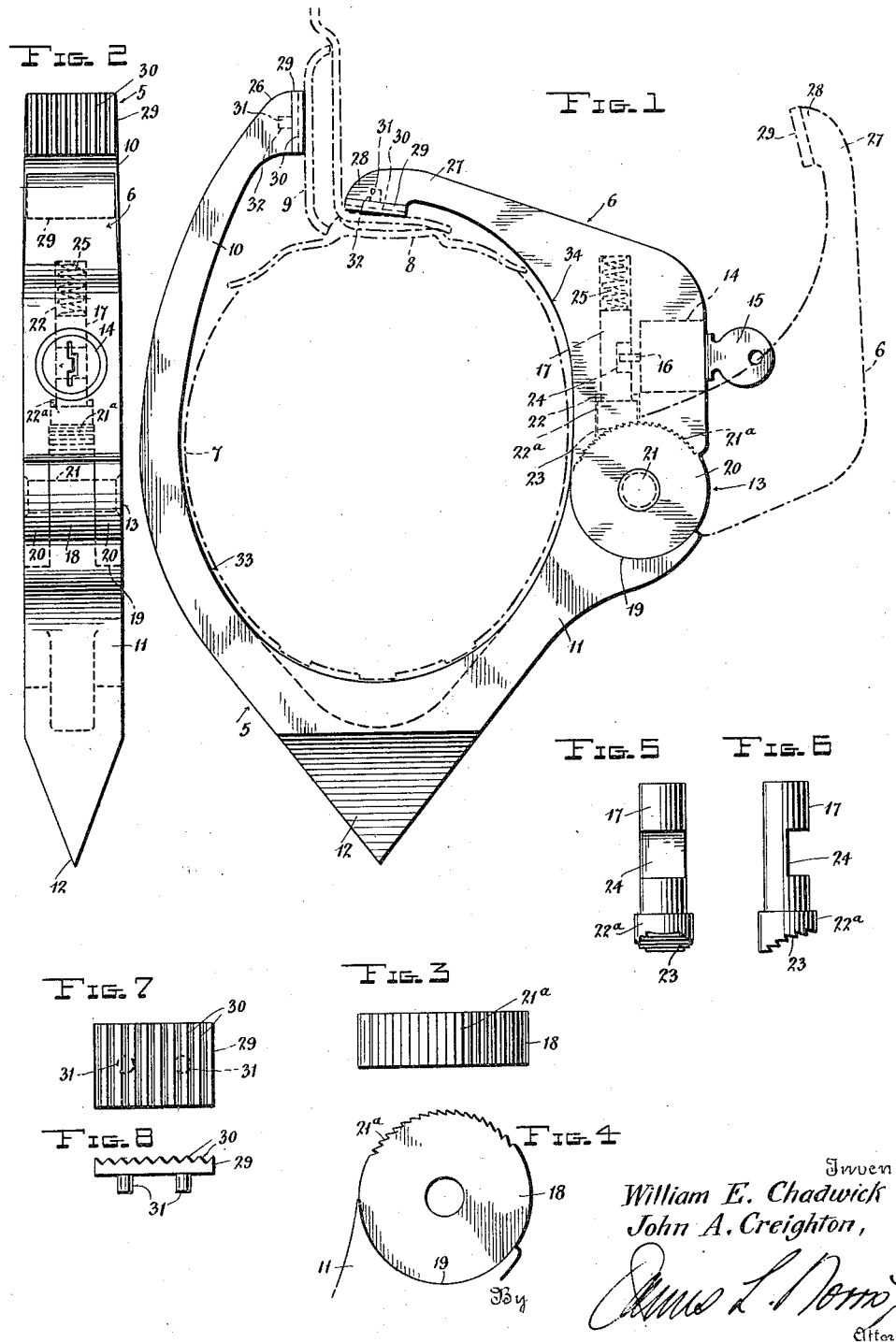

1,500,924

UNITED STATES PATENT OFFICE.

WILLIAM E. CHADWICK AND JOHN A. CREIGHTON, OF LOS ANGELES, CALIFORNIA, ASSIGNORS TO GUSTAVUS EDWARD WESTBERG, OF LOS ANGELES, CALIFORNIA.

THEFT WARNING SIGNAL OR WHEEL LOCK FOR VEHICLES.

Application filed May 5, 1923. Serial No. 636,940.

*To all whom it may concern:*

Be it known that we, WILLIAM E. CHADWICK and JOHN A. CREIGHTON, citizens of the United States, residing at Los Angeles, county of Los Angeles and State of California, have invented certain new and useful Improvements in Theft Warning Signals or Wheel Locks for Vehicles, of which the following is a specification.

This invention relates to improvements in theft warning signals or wheel locks for vehicles and has for one of its objects to provide a device of this character which embodies novel features of construction whereby it can be readily, effectively and removably applied to the rim and tire of one of the wheels of a vehicle in such manner as to make it practically impossible for an unauthorized person to remove the signal or lock and while applied to the wheel to move the automobile or vehicle without attracting attention, and by its operation giving positive indications or markings in a road surface that will assist in following or trailing the course of the vehicle. A further object of the invention is to provide a theft warning signal or lock for vehicles particularly adapted for application to the disk type of vehicle wheel and in which there are no convenient openings for effecting a positive connection between the parts of the signal or lock around the tire or rim of the wheel as there is in a spoke wheel construction. A still further object of the invention is to provide a warning signal or wheel lock of the class specified wherein strength and durability are essential features and result from the location of the hinge and locking means at a material distance from the road contacting extremity of the improved device, and thereby reduce injury to the hinge joint and locking means to a minimum.

The present invention constitutes an improvement on the warning signal or wheel lock disclosed by our pending application filed February 7, 1922, Serial No. 534,797, and the features of improvements reside in the construction, arrangement and combination of parts more fully hereinafter described and claimed.

In the drawing:

Fig. 1 is a front elevation of a warning signal of wheel lock embodying the features of the invention and showing parts thereof in dotted lines and illustrated as being applied to a disk wheel also shown in dotted lines;

Fig. 2 is an edge elevation of the improved device;

Figs. 3 and 4 are detail views of a part of the lock hinge shown respectively in top plan and side elevation;

Figs. 5 and 6 are detail views of a latch bolt for engaging the parts of the lock hinge shown by Figs. 3 and 4; and Figs. 7 and 8 are detail views of yielding or rubber pads which are applied to the ends of the arms of the improved warning signal or wheel lock.

The numerals 5 and 6 designate, respectively, a rigid curved arm, which constitutes the major part of the device, and a minor or shorter arm of less dimensions, the two arms being movably connected by a hinge joint and adapted to partially encircle a tire 7 and rim 8 and bear against the disk portion 9 of a disk wheel. The rigid curved arm 5 is substantially of hook shape and comprises a long arm member 10 merging into a shorter arm member 11, a lower terminal contact projection or point 12 being located between the two arms. The hinge connection of the two arms 5 and 6 is located a considerable distance from the lower terminal projection or point 12, to reduce injury to, or disorganization of, the hinge and locking means that might otherwise result from the forceful impact or jarring action of the lower extremity or point 12 with the road or other surface over which the improved theft signal or wheel lock has movement when applied to a wheel. All parts of the improved theft signal or wheel lock are preferably formed of steel of such temper as to resist breakage during the successive impacts of the terminal projection or point 12 with the ground or road surface when the wheel to which the device is applied is rotating. Adjacent to the hinge connection and carried by the minor or shorter arm 6 is a lock 14 having an operating key 15 and provided with an inner rotatable projection 16, which cooperates with a slide bolt or latch pin 17, this part of the locking organization being mounted wholly within the extremity of the minor or shorter arm 6 adjacent to the hinge connection 13. This location of the movable elements of the locking organization above the hinge connection 13 is effective in avoiding disorganization and injury to the lock 14 as above specified, in view of the fact that the lock or locking organization 14, including the slide bolt or latch pin 17, are disposed at a considerable distance from the lower extremity or point 12. The lock or locking organization 14 as applied and operated is not only shielded and protected against injury by jar and jolt incident to the striking of the lower point or extremity 12 with the hard ground or road surface, but is rendered extremely difficult of access by unauthorized persons desiring to tamper therewith for the purpose of removing the improved device from a wheel after such improved device has been locked in position on the wheel. As in the structure disclosed by our pending application above noted, the hinge connection comprises a disk terminal 18 integrally formed with the upper terminal of the member 11 of the longer or major arm 6, this terminal member being reduced in thickness and centrally located with respect to the upper terminal of the member 11 by forming opposite side recesses 19. These recesses extend inwardly equal distances from the opposite sides of the upper terminal of the member 11, and the disk terminal 18 is flat and partially projects clear of the said upper terminal of the member 11. The lower enlarged extremity of the shorter or minor arm 6 is formed with opposite disk-like projections or members 20, which are spaced apart at their inner sides a sufficient distance to permit the insertion of the flattened or disk terminal 18 therebetween, the assembled parts being held in movable or pivoted association by a hinge pin 21 transversely inserted through the centers of the disk-like projections or members 20 and the disk terminal 18. The upper portion of the periphery of the flattened or disk terminal 18 is provided with a series of teeth 21$^a$, and these teeth are exposed through the lower terminal of a bore 22 formed in the lower extremity of the arm 6 and in which the locking bolt or pin 17 has free longitudinal sliding movement. The bore 22 extends upwardly into the lower extremity of the arm 6 across the inner side of the lock or locking organization 14 and in parallel relation to the said lock, the lock or locking organization 14 being fully inset within the lower extremity of the arm 6, as clearly shown by Fig. 1. The locking bolt or pin 17 is shown in detail by Figs. 5 and 6 and is essentially of cylindrical form in cross section, the lower end of this bolt or pin being formed with a head 22$^a$ having the lower end of concave curved beveled contour and provided with a plurality of transversely extending teeth 23. Above the head 22$^a$ and at a suitable point relatively to the rotatable projection 16 of the lock or locking organization 14 a substantially rectangular notch 24 opens through the side of the bolt or pin 17 and is of such dimensions as to operatively receive the said projection 16. The bore 22 is longer than the bolt or pin 17, and between the upper end wall of said bore and the upper end of the bolt or pin a spring 25 is interposed, the lower end of the spring bearing directly on the upper end of the bolt or pin 17. The spring 25 acts to normally force the bolt or pin 17 downwardly, to effect an engagement of the teeth 23 thereof with the teeth 21$^a$ of the flattened or disk terminal 18 of the member 11. The lock or locking organization 14 may be of any approved form of barrel type lock and is firmly secured to resist displacement within the lower extremity of the arm 6, and when the said lock and bolt or pin are assembled as shown in dotted lines in Fig. 1, the rotating projection 16 of the lock extends into the notch 24 of the bolt or pin and remains in this position at all times, the operation of the lock 14 through the medium of the key 15 in one direction resulting in an elevation of the bolt or pin 17 and release or disengagement of the teeth 23 at the lower end or lower side of the head 22$^a$ of the bolt or pin from the teeth 21$^a$ of the disk-like terminal 18, and thereby releasing the arm 6 so that the latter may be freely turned outwardly or released for application to or disengagement from a tire, rim and disk of a wheel. When the arm 6 is adapted to be locked in closed position, it is only necessary to move the same inwardly to effect an automatic locking action between the teeth 23 at the lower end of the head 22$^a$ of the bolt or pin 17 and the teeth 21$^a$ of the disk-like terminal 18, and when the parts are in locked association as just explained, opening movement of the arm 6 will be obstructed until the key 15 is regularly and authoritatively inserted in the lock to operate the latter to elevate the bolt or pin 17 and release the teeth 23 from the teeth 21$^a$. The curved formation of the lower end of the head 22$^a$ corresponds to the curve of the disk-like terminal 18, so that the teeth 23 at the lower end of said head will readily slide over the teeth 21$^a$ of the terminal 18 in close contact therewith during the closing movement of the arm 6.

The upper ends of the arms 5 and 6 are at different elevations, the upper extremity 26 of the arm 6 being directed inwardly at an angle, so as to bring the engaging face thereof in parallel relation with the portion of the disk wheel with which it is adapted to contact. The inner extremity 27 of the arm 6 is reduced and formed to have a downward projection 28 to engage the lower part of the disk wheel where the latter is secured to the rim, as shown in dotted lines by Fig. 1. The lower extremity of the arm 6 carrying the lock or locking organization 14 and the bolt or pin 17 is materially enlarged and widened, so as to provide for the application thereto of the lock or locking organization 14 and the bolt or pin 17, and also to give this arm a very strong construction adjacent to its hinged association with the disk-like terminal 18 forming the upper terminal of the member 11 of the arm 5.

The disk and tire engaging ends of the arms 5 and 6 are each provided with a yielding pad 29, both pads being substantially flat and covering the arm ends. The engaging face of each pad 29 has a series of transverse corrugations 30, to effectively bear upon and firmly engage either one side of the disk wheel or the part of the latter over the rim of the tire. Each pad 29 is secured to its arm end through the medium of studs or pins 31 integrally formed with the back side thereof and secured in corresponding sockets 32 formed in the arm end to which the pad is applied.

From the foregoing it will be seen that a very simple and structurally effective theft signal or wheel lock for automobile wheels is provided and especially adapted for application to a disk wheel and its rim, and through the medium of the positions of the arm ends with one above the other and having a different direction in bearing engagement when applied, the improved signal or wheel lock is rendered extremely difficult in unauthorized removal, particularly in view of the fact that the inner curved edges 33 and 34 of the respective arms 5 and 6 snugly embrace the greater portion of the tire, as clearly shown by Fig. 1. The rotation of the wheel to which the improved signal or lock is applied will cause the point of the projection 12 to rotate with the wheel and at intervals strike the roadway or street surface and lift the vehicle and thus produce a noise that will attract the attention of pedestrians or passersby and at the same time leave a distinct mark or indentation and thereby form a trail that may be readily followed should a theft be effected in spite of the noise produced, especially at a time when there may be no pedestrians or passersby adjacent to the roadway or street. Among other advantages resident in the improved theft lock or signal is the resistance to maximum efforts to forcefully open the arm 6 after the latter has been locked closed, and which is the result of the location of the locking devices or locking means that maintain the said arm closed, there being no crevices or openings through which the essential parts of the lock or locking organization 14 and bolt or pin 17 and the disk-like terminal 18 may be reached from the exterior, and even though the lock or locking organization 14 might be in extreme cases withdrawn from its applied position, the arm 6 would still remain locked until further possible manipulation of the bolt or pin 17 would ensue to disengage the latter from the teeth 21$^a$ of the disk-like terminal 18. Another advantage in the improved construction is that the longitudinally movable bolt or pin 17 engages the teeth of the disk-like terminal at one side of the diameter of the latter when the shorter arm 6 is closed and locked, and thereby provide a stronger resistance to forcing the said arm 6 to open position, and also obstruct loosening or disengagement of the bolt or pin by vibration or jar imposed on the improved device by impact thereof with the road surface.

It is proposed, to accommodate various applications, to change the proportions, dimensions and minor details of the several parts of the improved theft signal or wheel lock without departing from the spirit and scope of the invention.

What is claimed as new is:

1. A device of the class specified, comprising tire embracing arms having ends pivotally connected to form a hinge, the one arm being materially shorter than the other arm and disposed at an angle to the latter and the longer arm carrying a road surface engaging point at the lower portion thereof and at a distance below the pivotal connection of the two arms, the longer arm being shaped and arranged for engagement with the side of a part of a wheel and the shorter arm constructed for downward engagement with another part of a wheel, and means located above the pivotal connection of the two arms and cooperating with a portion of the said pivotal connection for releasably locking the arms in closed position.

2. A device of the class specified comprising tire embracing arms having ends pivotally connected to form a hinge and one of the arms provided with a road surface engaging point, the upper end of one arm being shaped to engage the side portion of a wheel and the upper end of the remaining arm disposed at an angle for downward engagement with relation to another part of the wheel and rim, and means for releasably locking the device in closed position.

3. A device of the class specified comprising tire and disk wheel embracing arms having ends pivotally connected to form a hinge and the one arm provided with a road surface engaging point, the upper end of one arm being located above the upper end of the remaining arm and shaped to engage the side portion of a disk wheel and the upper lower end of the remaining arm being constructed to exert a downward engaging pressure with an opposite portion of the disk wheel adjacent to the rim of the latter, and means adjacent to the hinge joint of the two arms for releasably locking the one arm in relation to the other.

4. A device of the class specified comprising tire embracing arms having ends pivotally connected to form a hinge and the one arm provided with a road engaging spike, the arm provided with the road engaging spike being materially longer than the remaining arm and the latter shorter arm extending across and terminating below the upper terminal of the longer arm when the shorter arm is in closed locked position, and locking means located adjacent to the hinge joint of the two arms and protected against exterior tampering.

5. A device of the class specified, comprising tire embracing arms having ends located above the lowermost portion and at one side of the device and pivotally connected to form a hinge, the hinge end of one arm consisting of a fixed flat disk having upper peripheral teeth and the hinge end of the other arm being slotted to receive said disk, a vertically disposed longitudinally movable bolt carried in the arm having the slotted end to engage the teeth of the said disk, and locking means disposed at right angles to the said bolt and carried by the same arm as the latter and having a component to engage said bolt for releasing the latter.

6. A device of the class specified, comprising tire embracing arms having ends movably associated to form a hinge connection, the one arm being longer than the other and the hinge connection of the two arms located above the lowermost terminal and at one side of the device, the longer arm being provided with a lower road surface engaging point, the longer arm also provided at its hinge end with a flat disk with upper peripheral teeth and the shorter arm at its hinge end being slotted to receive the disk and movable outwardly and inwardly with relation to the longer arm, the shorter arm having a vertically disposed longitudinally movable bolt to automatically engage the teeth of the disk and provided with a lock arranged at right angles thereto, the said lock having a component for controlling the release of the bolt, the shorter arm when closed being automatically locked through the coaction of the bolt and the disk.

7. A device of the class specified comprising tire embracing arms of different lengths having ends movably associated to form a hinge connection and the longer arm provided with a road engaging point, the hinge connection for the arms being located at a considerable distance from the point of the longer arm, the upper end of the shorter arm when in engaging position being below the upper end of the longer arm and disposed at an angle relatively to the upper end of the longer arm, and locking means located in the shorter arm to engage a part of the longer arm at the hinge connection for the two arms.

8. A device of the class specified comprising tire embracing arms of different lengths and the longer arm having a road surface engaging point at its lower extremity, the arms being movably associated to form a hinge connection located at a distance from the said point of the longer arm and the upper wheel engaging ends of the arms being at different angles relatively to each other and one located below the other when the device is applied, the hinge connection between the arms including a flat disk at the terminal of the longer arm formed with peripheral teeth, and locking means held within the hinged extremity of the shorter arm and comprising a lock proper having an inner rotatable projection and a longitudinally movable spring actuated bolt operably engaged by said projection and having a lower toothed end to engage the teeth of the said disk.

9. A device of the class specified, comprising tire embracing arms movably supported to form a hinge connection which is located above the lowermost portion and at one side of the device, the device having at its lowermost portion a point for engaging the road surface, the hinge connection between the arms including a flat disk at the one terminal of the one end formed with peripheral teeth and movably fitted in the adjacent terminal of the remaining arm, and locking means held within the hinged extremity of the latter arm and comprising a vertically disposed longitudinally movable spring actuated bolt having a lower concaved end formed with teeth to engage the teeth of the flat disk at one side of the vertical diameter of the latter when the arm carrying the locking means is closed and a lock proper extending into the arm carrying the bolt at an angle to the latter and provided with a component for releasing the bolt.

10. A device of the class specified, comprising tire embracing arms movably associated to form a hinge connection located above the lowermost portion and at one side of the device and the one arm provided with a lower road surface engaging point, the upper ends of the arms being disposed for engaging the parts of a wheel in different directions and the upper free ends of the arms each having a flat yielding cushion formed with a corrugated engaging surface and provided with studs at the outer portions thereof which are secured in the arm ends, and means for releasably locking the one arm closed with relation to the other arm.

In testimony whereof we have hereunto set our hands.

WILLIAM E. CHADWICK.
JOHN A. CREIGHTON.